United States Patent [19]

Suzuki

[11] 4,176,383
[45] Nov. 27, 1979

[54] TAPE MACHINE HAVING AUTOMATIC RETURN TO PLAYBACK MODE AFTER FAST FORWARD OR REWIND

[75] Inventor: Nobuo Suzuki, Sagamihara, Japan

[73] Assignee: Technical Incorporated, Japan

[21] Appl. No.: 885,276

[22] Filed: Mar. 10, 1978

Related U.S. Application Data

[63] Continuation-in-part of Ser. No. 665,386, Mar. 10, 1976, abandoned.

[30] Foreign Application Priority Data

May 29, 1975 [JP] Japan .................................. 50-65040

[51] Int. Cl.² ......................... G11B 21/22; G11B 5/54
[52] U.S. Cl. ..................................... 360/105; 360/137
[58] Field of Search ........................ 360/137, 105, 96; 74/483 PB

[56] References Cited

U.S. PATENT DOCUMENTS 3,921,215 11/1975 Asami .................................. 360/137
4,128,853 12/1978 Nakazono ........................... 360/105

FOREIGN PATENT DOCUMENTS 2747026 4/1978 Fed. Rep. of Germany ........... 360/137

Primary Examiner—Robert S. Tupper
Attorney, Agent, or Firm—Hill, Van Santen, Steadman, Chiara & Simpson

[57] ABSTRACT

A magnetic tape machine which has recording, rewind, playback, fast forward and stop keys and which is provided with a locking plate such that when the machine is in the playback mode and either the fast forward or rewind keys are depressed, the machine will go into the fast forward or rewind modes but will return to the playback mode when the fast forward or rewind keys are released.

10 Claims, 5 Drawing Figures

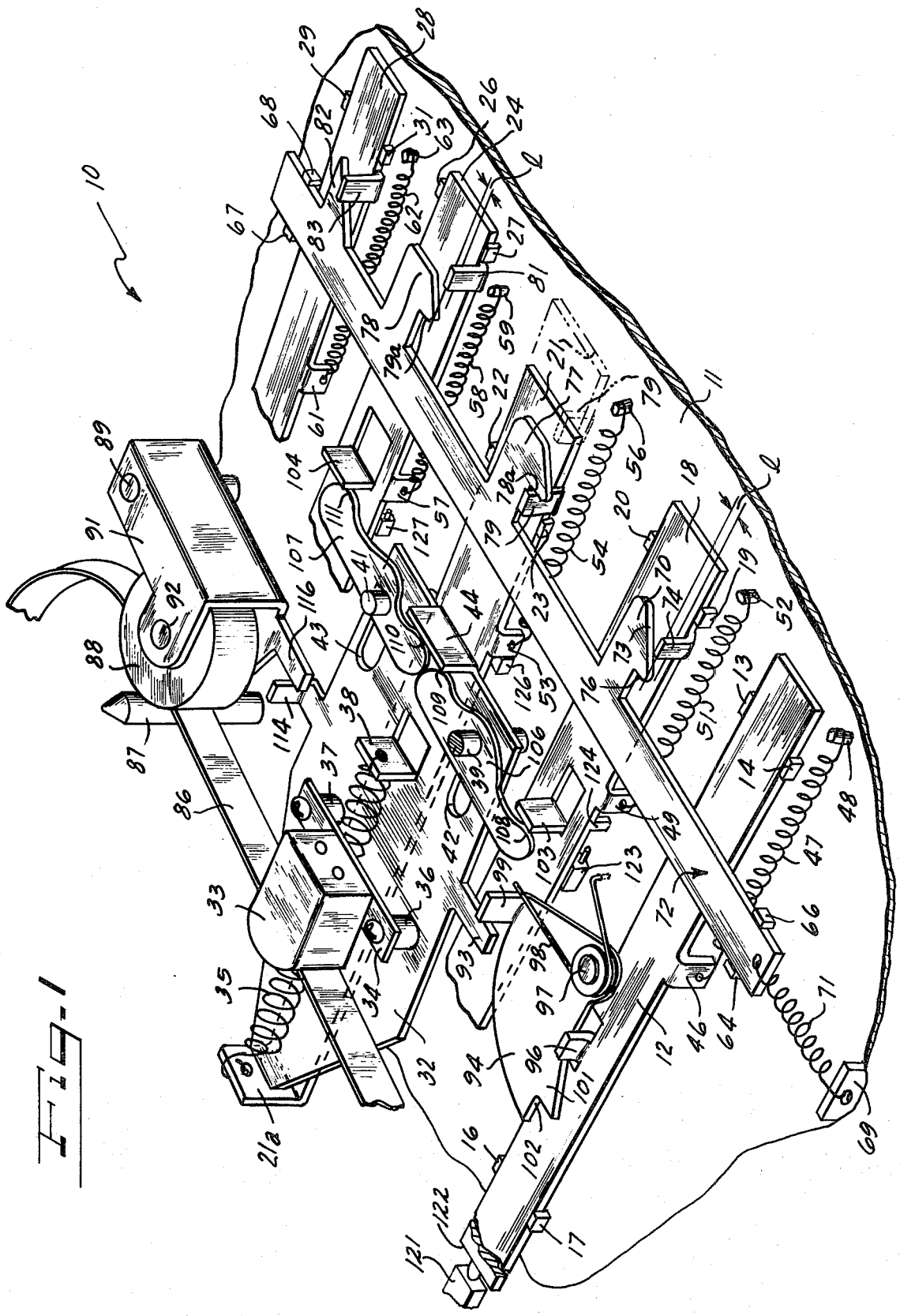

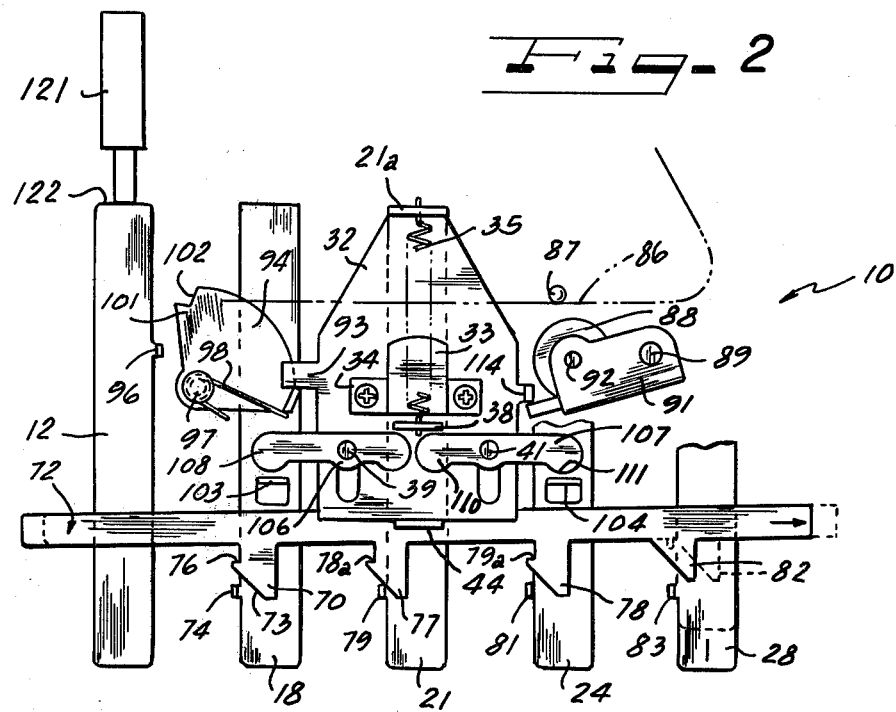
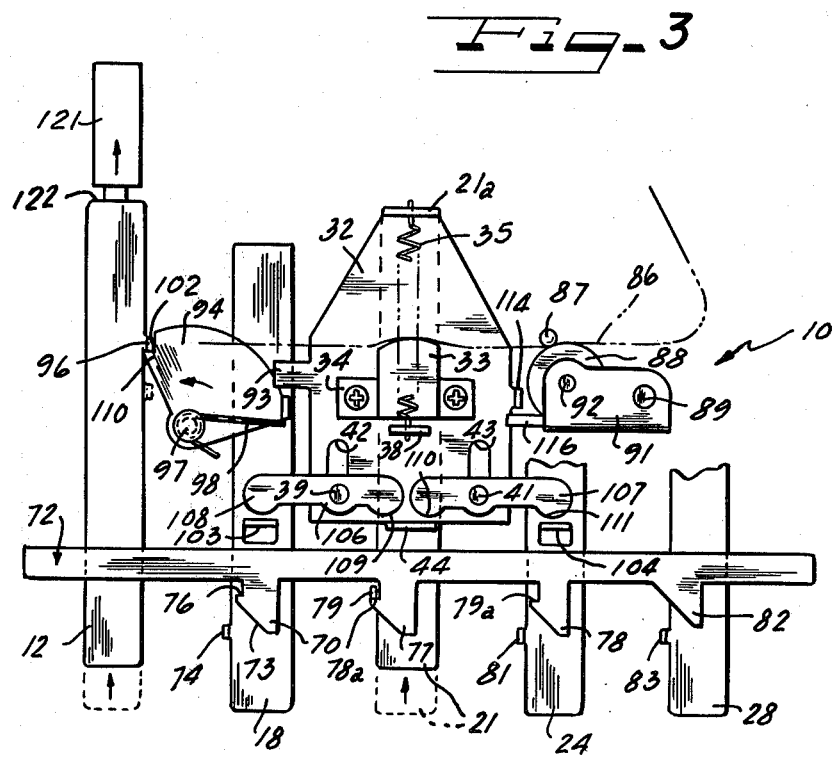

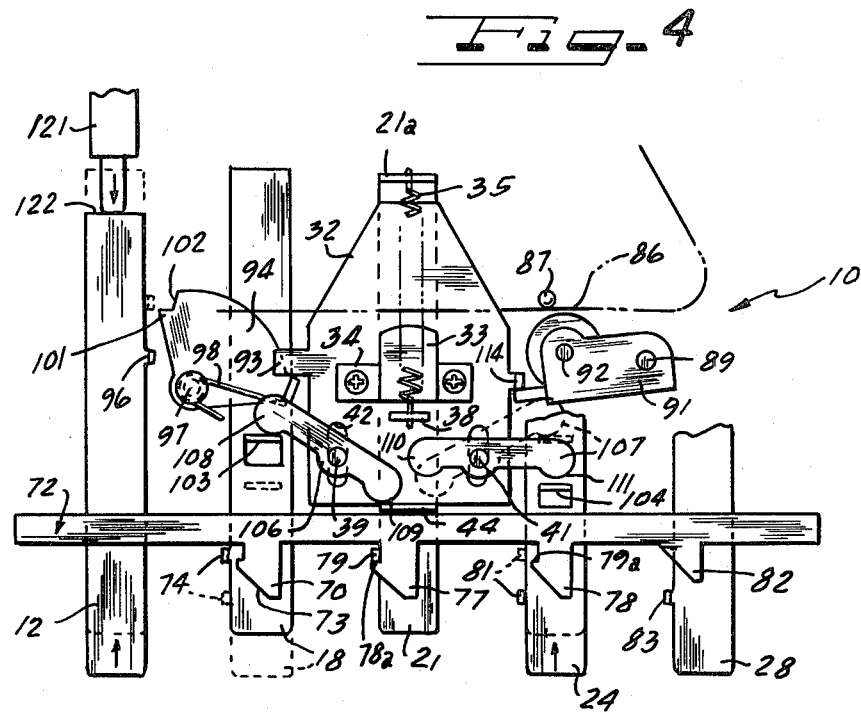
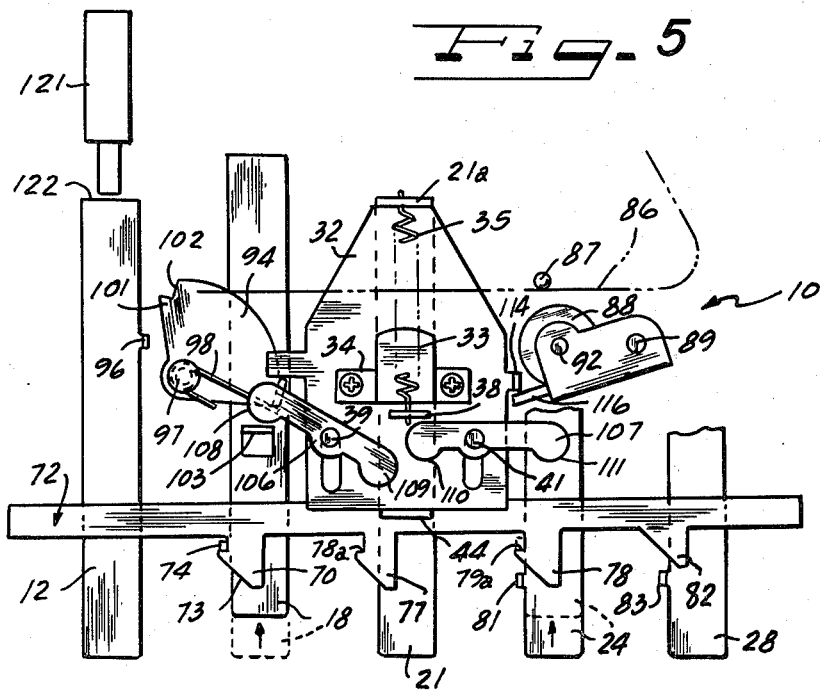

TAPE MACHINE HAVING AUTOMATIC RETURN TO PLAYBACK MODE AFTER FAST FORWARD OR REWIND

CROSS-REFERENCES TO RELATED APPLICATIONS

This application is a continuation-in-part of application Ser. No. 665,386, filed Mar. 10, 1976 now abandoned.

BACKGROUND OF THE INVENTION

1. Field of the Invention

This invention relates in general to magnetic tape machines and in particular to a machine having automatic playback features.

2. Description of the Prior Art

Magnetic tape machines are known for fast forward and rewinding operations which are used in cue review and repeating operations during playback of the machine. In conventional tape reproducing and recording machines when operating in the playback mode are first stopped before switching to the fast forward or rewind mode. In such systems the fast forward or rewind mode is initiated by depressing a stop button which terminates the playback mode after which the fast forward or rewind mode can be instituted. Also, the stop button is pushed to end either the fast forward or rewind mode and the machine stops. It is then necessary to depress the playback key to establish the playback mode in such prior art machines.

There are other tape machines which can be placed in the fast forward or rewind mode by continually depressing the fast forward or rewind keys, however, in such machines the normal tape playback mode must be first initiated if it is desired to have the machine returned to the playback mode after the fast forward or rewind operation. Also, the playback button might have to be kept depressed throughout the fast forward or rewind operation.

SUMMARY OF THE INVENTION

It is very desirable to have a machine which functions such that it can be continuously changed over from playback operation to fast forward back to playback for cue review or for rewind and repeating the playback mode during recording or playback operation. It is also desirable for rewinding the whole length of tape or for fast forwarding the tape for a considerable length of tape to have a mechanical lock which holds the fast forward or rewind buttons mechanically until the operation has been completed.

The present invention relates to a tape machine which has these desirable characteristics.

The present invention provides a simple and inexpensive mechanism which utilizes many of the essential elements of the conventional push button machines and which can be operated by relatively light operating force by the operator.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is generally a cutaway perspective view of the mechanism;

FIG. 2 is a top plan view of the invention in the "stop" position;

FIG. 3 is a top plan view of the invention in the record mode;

FIG. 4 is a top plan view illustrating the invention in the "review" or "cue" modes; and FIG. 5 is a top plan view illustrating the invention in the "rewind" or "fast forward" modes.

DESCRIPTION OF THE PREFERRED EMBODIMENTS

FIG. 1 illustrates the tape machine 10 in cutaway perspective and includes the frame of the machine 11 which supports five slidable and movable actuating keys 12, 18, 21, 24 and 28. These keys are all supported for movement parallel to each other on the frame 11. Recording key 12, for example, is supported by guides 13 and 14 and 16 and 17 attached to the frame 11. Rewind or review key 18 is supported by guides 19 and 20, playback key 21 is supported by guides 22 and 23, fast forward or cue key 24 is supported by guides 26 and 27 and stop key 28 is supported by guides 29 and 31. The recording key 12 is biased to the right relative to FIG. 1 by a spring 47 which extends between a standoff 48 connected to the frame 11 and a projection 46 of the key. Rewind or review key 18 is biased to the right relative to the drawing by a spring 51 which extends from standoff 52 and projection 49. Playback key 21 is biased to the right relative to FIG. 1 by spring 54 which extends from standoff 56 to the projection 53. Fast forward or cue key 24 is biased to the right relative to FIG. 1 by a spring 58 which extends between the standoff 59 and projection 57. Stop lever 28 is biased to the right by a spring 62 which extends from standoff 63 to a projection 61.

Playback key 21 has a projection 21a at its end opposite from its actuating end which carries a spring 35 that is connected to a projection 38 of a plate 32 which carries a magnetic head 33 supported by standoffs 36 and 37 and a plate 34. The plate 32 is formed with a pair of slots 42 and 43 through which pins 39 and 41 which are mounted to the frame 11 extend such that the plate 32 and the magnetic head 33 can move relative to the frame 11 and the playback key 21. A capstan 87 is connected to a suitable capstan motor not shown and is supported by the frame 11 of the machine. The magnetic tape 86 passes by the magnetic head 33 and the capstan 87 and a pinch roller 88 supported on a suitable bracket member 91 and rotatably supported on shaft 92 is pivotally supported by a shaft 89 to the frame 11 of the machine and when spring biased against the tape 86 and the capstan 87 causes the capstan to drive the tape. The plate 32 carries a projection 114 engageable with a projection 116 which is mounted on the bracket 91 so as to move the pinch roller 88 away from engagement with the tape 86 and the capstan 87.

A pair of links 106 and 107 are respectively mounted on shafts 39 and 41. The link 106 has a first end 108 which engages a projection 103 on rewind or review key 18 and a second end 109 which engages a projection 44 on plate 32. The link 107 has a first end 111 which engages a projection 104 on fast forward or cue key 24 and a second end 110 which engages the projection 44.

A locking bar 72 is slidably mounted so as to move transversely to the actuating keys 12, 18, 21, 24 and 28 by guides 66, 64, 67 and 68.

The locking bar 72 is formed with four projections 70, 77, 78 and 82 which are capable of engaging projections. For example, the projection 70 is engageable with a projection 74 on rewind or review key 18. The projection 77 is engageable with a projection 79 on playback key 21. The projection 78 is engageable with a projection 81 mounted on fast forward or cue key 24. The projection 82 is engageable with a projection 83 carried by the stop key 28.

The projections 70, 77 and 78 are generally hook shaped such that when the respective key is depressed the projection 70, 77 and 78 will be cammed to the right moving the locking bar 72 toward the right relative to FIG. 1 and such that the projection has a surface which engages and locks the key in the "in" position. For example, when the playback key 21 is depressed the portion 78a of the projection 77 will due its outer tapered surface push the locking bar 72 to the right relative to FIG. 1 until the projection 79 of the playback key passes beyond the projection 77 after which it locks the bar 72 in the position shown due to the engagement of the surface 78 with the projection 79. When the projection 79 is locked with the projection 77 of the locking bar 72 the projections 74 and 81 can move pass the ends of the projections 70 and 78 without engaging them since the projection 79 holds the locking bar 72 a distance to the right which is sufficient to prevent the projections 74 and 81 from engaging the projections 70 and 78 when the playback key is in the locked position. On the other hand, if the playback key 21 has not been depressed and the projection 79 is not locked with the projection 77 the projection 81 will engage the outer cam surface of projection 78 to move the locking bar 72 to the right relative to FIG. 1 until the surface 79a is locked with the projection 81 in the fast forward mode. Alternatively, if the playback key has not been depressed and the rewind key 18 is depressed, the projection 74 will engage the curved surface of the projection 70 moving the locking bar 72 to the right relative to FIG. 1 until the projection 74 locks with the surface 76 against the projection 74.

A cam plate 94 is pivotally attached by a pin 97 to the frame 11 and is spring biased by a spring 98 in the counterclockwise direction relative to FIG. 1. A projection 99 engages a projection 93 of the plate 32 and a cam surface 101 engages a projection 96 on the recording key 12. An indentation 102 beyond projection 101 allows the projection 96 to fall into the indentation 102 so as to lock the cam plate 94 in a counterclockwise position when the machine is in the record mode. When the machine is in the record mode the playback key is also depressed so that the head 33 will be against the tape and cam plate will be in a position to lock the record key 12 due to engagement of projection 96 in depression 102.

A record switch 121 is mounted near a projection 122 on the record key 12 so as to energize the record circuitry of the machine when the record switch 12 is depressed. A rewind switch 123 is mounted adjacent a projection 124 on the rewind key 18 so as to energize the electrical circuit for rewind mode when the rewind key 18 is depressed.

A playback switch 126 is mounted to energize the playback mechanism when the projection 53 of the playback key 21 engages it.

A fast forward switch 127 is mounted so as to be engaged by the projection 57 of the fast forward or cur key 24 when the fast forward or cue key is depressed.

In operation, when this machine is not operating, the playback key 21 is not depressed and is in the dotted position illustrated in FIG. 1 with the projection 77 not locked against the projection 79. In this condition, the head 33 will move away from the tape 86 because the moving plate 32 is coupled to the playback key 21 because projection 21a engages the end 32a of the plate 32 and the spring 54 pulls key 21 and plate 32 so that magnetic head 33 moves away from the tape 86.

When the playback key 21 is depressed to the solid line position shown in FIG. 1, the force of the spring 35 moves the magnetic head 33 against the tape of the play position. Simultaneously, the projection 79 engages the outer cam surface of the projection 77 causing the locking plate 72 to move upwardly to the right relative to FIG. 1 until the projection 79 falls behind the projection 78 as shown in FIG. 1. In this condition, the playback switch 126 is energized by the projection 53 thus, energizing the capstan motor to drive the capstan 87 and the pinch roll 88 will move to the position shown to engage the tape 86 and the capstan 87 because the projection 114 which engages projection 116 allows the pinch roll 88 to move against the tape 86 and capstan 87 and, thus, driving the tape relative to the head 33. Since the surface 78 is behind the projection 79, the playback key 21 will be held in the depressed position and the machine will operate in the play mode.

For recording mode the recording key 12 and the play key 21 are depressed. As the key 12 is depressed, the spring 47 will be stretched and the projection 96 will slide along the edge of projection 101 of the plate 94 which causes the plate 94 to rotate against the spring 98 about the pivot shaft 97 until the projection 96 rides beyond the projection 101 to engage the indentation 102 in the plate 94. The projection 101 will hold the recording key 12 in the depressed position so that recording can occur. A recording switch 121 engages a projection 122 on the recording key 12 to energize the recording circuitry of the machine.

For fast forward or cue operation during either recording or playback modes the fast forward key 24 can be depressed against the spring 58 and this will cause the projection 104 to move link 107 about shaft 41 in the counterclockwise direction relative to FIG. 1. The other end of 110 of lever 107 will press projection 44 of plate 32 to the right relative to FIG. 1 to move it against the weak spring 35 toward the right in the drawing. This moves magnetic head 8 and the pinch roller 12 from engagement with the tape. Also, a switch 127 is engaged by projection 57 to energize the fast forward electrical circuitry of the machine when key 24 is depressed.

When the playback key 21 is locked in the position shown in the drawing with the projection 77 locking the projection 79, neither the projections 74 or 81 of the rewind or review key 18 or the fast forward or cue key 24 will lock behind the projections 70 and 78 because the width of these projections is less than the projection 77 by a distance "1" and thus the projections 74 and 81 will not lock the rewind key or fast forward key in the depressed position when the playback key has been depressed. This means that rewind and fast forward will occur only as long as these keys are held in when the play key 21 is engaged and as soon as they are released the machine will return to the playback or record modes automatically.

In order to unlock the playback key when it is locked in the position shown in FIG. 1, the stop key 28 is depressed causing the projection 83 to move against the triangular shaped projection 82 thus moving the locking bar 72 further to the right until the surface 78a of the projection 77 clears the projection 79 of the playback key at which time it will move due to the action of the spring 54 to the unlocked position to terminate the play or record modes and the switch 126 will be disengaged from the projection 53, thus, discontinuing the playback mode.

When it is desired to wind in the forward direction or rewind a relatively large quantity of tape either the fast forward key 24 or the rewind key 18 can be depressed and these keys will respectively energize the electrical circuit causing actuation of the driving motor, not shown, and make the power transmission connections so as to provide the desired tape running operation. During either of these operations, if the playback key is not in its locked position either the fast forward key 24 or the rewind key 18 can lock on the projection 78 and 70 to hold the respective keys in the depressed position so that the machine will operate without the fast forward or rewind keys being manually held in the "in" positions. In order to stop operation of the fast forward or rewind modes the stop key 28 is depressed thus releasing the projection 81 or 74 so that the fast forward or rewind keys will move to the off position.

With the invention, if in the playback or record modes with the playback key 21 in the depressed and locked position shown in FIG. 1 either the fast forward key 24 or fast rewind key 18 can be depressed and held and the machine will go into the fast forward or rewind mode as long as such keys are held in the in positions. As soon as such keys are released, the machine will automatically return to the playback mode without further operation of either the stop or playback key. This allows the cue review or repeated playback to be performed in a simple and instantaneous manner. Also, when both the playback key 21 and the record key 12 are in the depressed and locked position either of keys 24 or 18 can be depressed for fast forward or rewind operation.

It is also to be realized that the invention utilizes many elements and parts of conventional push button type tape reproducers and recorders and, thus, it is very convenient for assembly and manufacture.

Also, the mechanism can be easily operated with very little manual force as compared to conventional push button tape reproducers or recorders.

The solid line position in FIG. 1 of key 21 illustrates the playback mode. Key 21 when depressed moves plate 32 in a direction such that head 33 is against the tape 86 and the pinch roller 88 moves the tape 86 against the capstan 87 to drive the tape.

FIG. 2 illustrates condition of the machine when the stop key 28 has been depressed. This releases the locking arrangement of the bar 72 and the play key 21. Also of course, if the rewind key 18 or the fast forward key 24 had been locked by bar 72 rather than play key 21 they would have been released by depression of stop key 28. It is to be particularly noted that the plate 32 moves the head 33 away from the tape 86 when the stop key is depressed because this always releases the play key 21 and the play key 21 pulls the plate 32 to the position shown in FIG. 2 due to the engagement of projection 21a with end 32a of plate 32. Also note that projection 114 allows pinch roller 88 to move away from the tape 86 and the capstan 87. Also, member 94 will be rotated clockwise to the position shown in FIG. 2 when the stop key is depressed and projection 96 will always under this condition be released from engagement with depression 102 so that the record key will return to the position shown in FIGS. 1 and 2 when the stop key is depressed.

FIG. 3 illustrates the record mode and for this mode both the play key 21 and record key 12 must be depressed for "record" mode. The play key 21 will lock in the engaged position when projection 79 engages 78a and this will move the head 33 into engagement with the tape 86, the pinch roller 88 will move to drive the tape and the member 94 will move counterclockwise to the position shown in FIG. 3 so that record key will lock in the engaged position because projection 96 will move into recess 102.

FIG. 4 illustrates the condition for review or cue. For example, if key 18 is depressed when play key 21 is locked, the lever 106 will push plate 32 down relative to FIG. 4 which causes projection 93 to engage projection 99 thus rotating member 94 to a position such that record key 12 is released. At the same time head 33 will move away from tape 86 and pinch roller 86 will move away from tape 86. The same actions occur if cue key 26 is depressed.

FIG. 5 illustrates the condition for fast forward or rewind and for this condition if the play key was previously locked in, the stop key 28 would be depressed to release the play key 21 and this always also releases the record key 12 if it had been locked in at that time. Then depression of the rewind key 18 would engage rewind switch 123 and the head 33 and pinch roller 88 would be in position as shown out of engagement of the tape and capstan. Similarly for fast forward operation key 26 would be depressed with the play and record keys unlocked and fast forward would occur with head 33 and pinch roller 88 out of engagement with the tape and capstan.

With this invention, recording and playback can be operated by means of a single record and playback head 33. This is well known and popular head arrangement. There is no other record head on the plate 32.

The special feature and advantage of the invention is that when the machine is in the recording mode and either the fast forward or rewind keys are depressed, the machine will go into the fast forward or rewind modes but will return instantly to the playback mode when the fast forward or rewind keys are released.

For recording mode, first of all the playback key 21 is depressed, then the recording key 12 is depressed against the spring 47 and the projection 96 will slide along the edge of projection 101 of the plate 94 which causes the plate 94 to rotate against the spring 98 about the pivot shaft 97 until the projection 96 rides beyond the projection 101 to engage the indentation 102 in the plate 94. The projection 101 will hold the recording key 12 in the depressed position so that recording can occur. A recording switch 121 engages a projection 122 on the recording key 12 to energize the recording circuitry of the machine.

When the fast forward or rewind keys are depressed during recording operation, this will cause the projections 104 or 103 to move links 107 or 106. The other ends of 110 of lever 107 or 109 of lever 106 will press projection 44 of plate 32 to the right relative to FIG. 1 to move it against the weak spring 35 toward the right in FIG. 1. This moves magnetic head 33 and the pinch roller 88 from engagement with the tape 86. Also this moves cam plate 94 by pressing projection 93 engaged projection 99 on the plate 94 in the clockwise direction relative to FIG. 1. This will cause the release of engagement of the projections 101 and 96, so that the recording key 12 will be returned to the original position by the spring 47, and the record switch 12 will be released automatically.

Thus, it can be changed over from recording operation to fast forward or rewind by continually depressing the fast forward or rewind keys, however, since the playback key is kept depressing position by the projection 77 engaged with a projection 79 on playback key 21, the fast forward key 24 nor rewind key 18 cannot be locked with the projections 78, 70 of the locking bar 72, so that the machine will go into the playback mode when the fast forward or rewind keys are released.

Although the invention has been described with respect to preferred embodiments, it is not to be so limited as changes and modifications can be made which are within the full intended scope of the invention as defined by the appended claims.

I claim as my invention:

1. A recording and playback tape machine having a magnetic head, a capstan, magnetic tape and a pinch roller comprising, a frame, a playback key lever mounted for limited slide movement on said frame and first means biasing said playback key lever in a first direction, an actuating plate mounted on said frame and engaged by said playback key lever, said magnetic head mounted on said actuating plate, said playback lever when depressed moves said actuating plate toward said tape, a fast forward key lever mounted on said frame and second means biasing it in said first direction, a rewind key lever moveably mounted on said frame and third means biasing it in said first direction, a first actuating lever attached to said frame for pivotal movement and having one end engageable with said actuating plate to move it in said first direction and a second end engageable with said fast forward key lever such that when said fast forward key is depressed, said actuating plate will be moved in said first direction to move said head away from said tape when said playback lever has been depressed and a second actuating lever attached to said frame for pivotal movement relative thereto and having one end which is engageable with said actuating plate to move it in said first direction and having a second end which is engageable with said rewind key lever such that when said rewind key lever is depressed said actuating plate will be moved in said first direction to move said head away from said tape when said playback lever has been depressed.

2. A recording and playback tape machine according to claim 1 including a locking plate supported on said frame to move transversely relative to said first direction and to said playback, fast forward and rewind key levers and having first locking means for holding said playback key lever in the actuated position when it is moved to the actuated position, third biasing means connected to said locking plate to bias it relative to said frame and second and third locking means for respectively, locking said fast forward and rewind key levers in the actuated position when they are moved to the actuated positions, and means for disabling said second and third locking means when said first locking means is actuated.

3. A recording and playback tape machine according to claim 2 including a stop key lever mounted on said frame for limited slide movement and fourth means biasing between said frame and said stop key lever to move it in said first direction, and including actuating means for releasing said first, second and third locking means.

4. A recording and playback tape machine according to claim 3 wherein said first locking means comprises a first projection attached to said playback key lever and a first hook shaped projection attached to said locking plate and having a cam surface engageable with said first projection so that said locking plate is moved relative to said frame when said playback key lever is depressed and wherein said projection engages said first hook shaped projection to lock said playback key lever in the depressed position.

5. A recording and playback tape machine according to claim 4 wherein said second and third locking means comprise second And third projections respectively formed on said fast forward and rewind key levers and second and third hook shaped projections attached to said locking plate and having cam surfaces engageable with said second and third projections so that said locking plate is moved relative to said frame when said fast forward and rewind key levers are moved and wherein second and third hook shaped projection lock said fast forward and rewind key levers in the depressed positions unless said playback key lever is locked in the depressed position.

6. A recording and playback tape machine according to claim 5 wherein said first hook has a size and shape which prevents said second and third hooks from locking when said first hook locks said playback key lever.

7. A recording and playback tape machine according to claim 6 wherein said stop key lever has a fourth projection and said locking plate has a triangular shaped projection engageable with said fourth projection so as to move said first, second and third hooks out of engagement with the first, second and third projections to allow the playback, fast forward and rewind key levers to return to the unactuated positions.

8. A recording and playback tape machine according to claim 7 including a record key lever mounted for limited slide motion on said frame and fifth means between said frame and record key lever to bias it in said first direction, a pivoted sector plate for pivotal movement on said frame, sixth means between said frame and sector plate to bias it in one rotary direction and formed with a first engaging portion engageable with said actuating plate to urge it in a second direction opposite said first direction, a fifth projection attached to said record key lever and a second engaging portion and a locking portion formed on said sector plate and engageable with said fifth projection to move it and lock said record key lever in the record position when said playback key lever has been depressed.

9. A recording and playback tape machine according to claim 8 including a sixth projection on said actuating plate and engageable with said pinch roller to move it in said second direction relative to said tape.

10. A recording and playback tape machine according to claim 9 including first, second, third and fourth electrical switches mounted so as to be energized by said playback, fast forward, rewind and record key levers to energize said tape machine for different modes of operation.

* * * * *